June 5, 1945.                    W. W. LINYARD                    2,377,561
TOOL HOLDER FOR RADIUS CUTTING
Filed Feb. 1, 1943
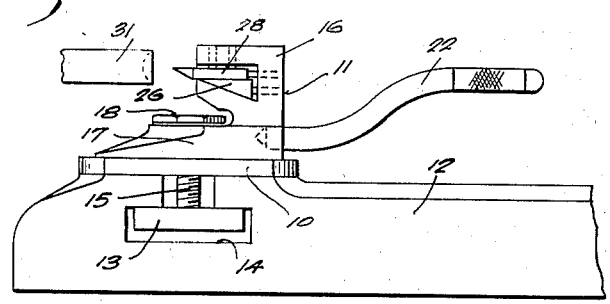
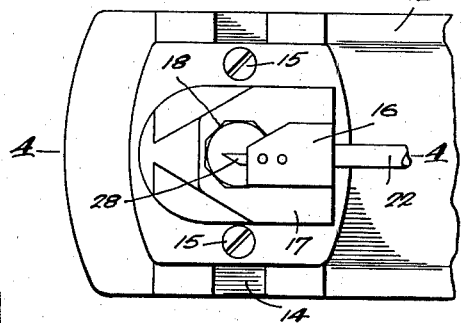
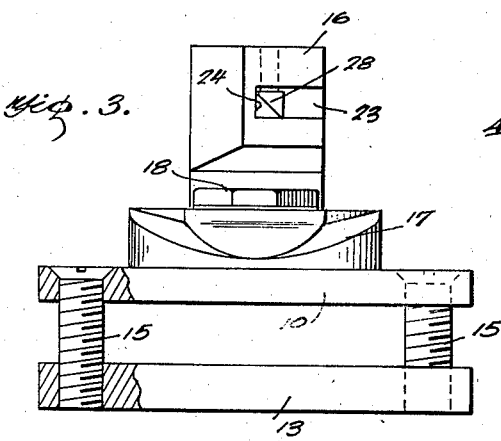
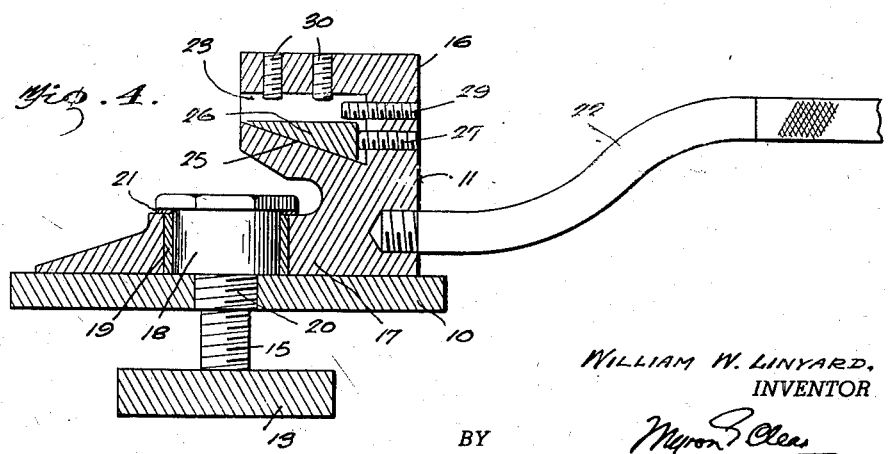
WILLIAM W. LINYARD,
INVENTOR
BY
ATTORNEY Patented June 5, 1945

2,377,561

UNITED STATES PATENT OFFICE 2,377,561

TOOLHOLDER FOR RADIUS CUTTING

William W. Linyard, Compton, Calif.

Application February 1, 1943, Serial No. 474,303

3 Claims. (Cl. 82—12)

The present invention relates generally to tool holders for radius cutting, and more particularly to a tool holder for support on the compound rest of a lathe, whereby a radius cutting tool may be held and manually controlled and manipulated, with the primary object of quickly, accurately and effectively concaving portions of lathe held and rotated work, the principal object of the invention being the provision of a labor and time saving device which will greatly speed production of certain classes of metal work and simplify the necessary operation to an extent permitting the employment of operators without general metal working skill and experience.

While the invention is designed primarily for a certain specific purpose, namely the cutting of the concave rivet engaging ends of riveting dies or sets as used in malleable rivet setting, as for example in airplane work, it may be useful in other work involving radius cutting in lathes, and it is to be understood that in the specific disclosure of the invention in its primary use, nothing is to be taken as a limitation in respect to other work for which it is, or may be, readily adaptable.

It is a well known fact that malleable rivets of aluminum or Duralumin, are applied in airplane work, by means of air operated riveting tools, the dies or rivet sets of which are detachable for repair and substitution, and fit the rivet heads, since the free ends of the rivet shanks are upset in the riveting operation. It is also well known it is essential in such use that the dies or rivet sets have axial end concavities which precisely match the contours of the rivet heads, and that they are subject to wear and battering in use which necessitates frequent reformation of such concavities.

At present, the above reformation operations are accomplished on a lathe by supporting the dies or rivet sets in a collet chuck and utilizing in the lathe tool post a cutting tool which is shifted axially into the end of the work by lengthwise movement of the lathe carriage. The tool, for this purpose, must have an arcuate end cutting surface which is precisely and accurately ground on an arc constituting one half of the finished or complete concavity. This requires tedious and accurate grinding and sharpening in the initial preparation of each cutting tool and in each subsequent sharpening thereof and, since the cutting edge of the tool is simultaneously in engagement with portions of the work, at its axis and perimeter, which are rotating at different speeds, there is a tendency toward tearing of the metal which leaves within the concavity a rough, pitted surface.

The result of the above is that in many instances surfacing of the concavity to produce the necessary mirror-like surface finish, becomes a lengthy and tedious operation even where the concavity has been previously cut or formed by an experienced metal worker.

It is proposed by the present invention to eliminate the foregoing disadvantages by the use of a cutter of the side cutter type and tapered to an end cutting point in line with its side cutting edge, and to provide for laterally swinging the same into the work in the plane of its axis, so as to gradually approach, along an arcuate line, to the axis of the concavity, on a swinging tool support shiftable by means of a handle, upon an anchoring member or support which may be fixed in the compound rest of a lathe in much the same manner as the ordinary tool post. By utilizing this method of cutting the concavities they may be speedily formed in the first instance with perfectly smooth surfaces so as to greatly facilitate their subsequent polishing, and a cutting tool may be used which needs no accurate formation beyond ordinary grinding and sharpening, and necessitates only ordinary resharpening at intervals.

Structurally, the invention, in its best form thus far devised, is shown in the accompanying drawing, which constitutes a part of this specification, and in which;

Figure 1 is a side view of the complete holder, with its cutter, as in use.

Figure 2 is a top plan view thereof.

Figure 3 is an enlarged front elevation, with certain parts broken away, and,

Figure 4 is an enlarged vertical, longitudinal sectional view therethrough, taken substantially on line 4—4 of Figure 2.

Referring now to the above mentioned drawing, and particularly to Figures 1 and 2, there is shown a tool holder according to the present invention, which comprises an anchor plate 10, and a tool holding pedestal 11 supported on said plate. There is also shown the compound rest 12 of a lathe, to which the plate 10 may be anchored, the latter being provided with a lower anchor bar 13 adapted to enter the rest groove 14, and with anchoring screws 15 connecting the same with the anchor bar 13 whereby to thus secure the anchor plate on the rest in substantially the same manner as the ordinary tool post. It will be noted in Figure 3, that the clamping screws 15 are spaced upon opposite sides of the pedestal 11, and are flush with the upper surface of the anchor plate 10, so that the latter presents a smooth flat upper face on which the pedestal rests.

The pedestal 11 includes an upright 16 and a horizontally enlarged base 17 resting flatwise on the upper surface of the anchor plate 10 and projecting, for the most part, forwardly of the upright 16. The base 17 is mounted to swing or rotate horizontally on the anchor plate 10, upon a pivot bolt 18, the body of which snugly interfits a central, vertical bore of said base, and a lining or wear sleeve 19 within said bore, and the reduced lower threaded extension 20 of which is tapped into a conformable central opening of the anchor plate, as best seen in Figure 4.

The upper head of the pivot bolt 18 rests snugly on the upper surface of the base 17, partially beneath the undercut forward portion of the upright 16, and preferably engages a ring or washer 21 to create a slight pressure between the pedestal and the anchoring plate, so that while readily swingable under manual manipulation by an operator, the pedestal is normally prevented from accidental swinging movement.

At the rear of the base 17, and the lower portion of the upright 16, one end of a rearwardly projecting and upwardly offset handle 22 is shown as tapped securely into the pedestal 11, to facilitate manual, horizontal rotation of the pedestal in use.

Above the base 17, the upright 16 of the pedestal has a forwardly opening tool cavity 23 which is also open at one side through one side of the upright, and is formed with its single side wall 24 in a radial line in respect to the axis of the pivot bolt 18. This cavity 23 deepens from front to rear, having a rearwardly and downwardly sloping base 25 on which a triangular seat block 26 is movably disposed so that it presents and upper horizontal tool supporting surface which may be elevated as the seat block is shifted forwardly by an abutting set screw 27 threaded through the rear wall of the upright 16.

A tool 28 rests on the seat block 26 and is raised or lowered thereby, beneath the top wall of the tool cavity, the tool being engaged at its rear or inner end, when so seated, by an adjusting set screw 29 threaded through the rear wall of the upright 16, above set screw 27, to thus position the forward cutting end of the tool a selected distance beyond the forward surface of the upright. The tool 28 is thus adjustable both vertically and axially to compensate for repeated grinding and sharpening, and to aline its forward cutting point with the axis of the work as presently described. When so adjusted, the tool 28 is clamped firmly against the seat block 26, by set screws 30 threaded through the top wall of the upright to engage the tool at lengthwise spaced points. All of the set screws are preferably, though not necessarily, of the wrench-engaging socket type.

The front wall of the upright 16 is set back from the line of the vertical axis of the pivot bolt 18 for a short distance for clearance, and it is preferred that such distance, combined with the dimension of the upright from front to rear, equal a whole definite figure which, being known, will make it an easy matter to determine by the use of a micrometer gauge, the precise extension of the cutting point of the tool forwardly beyond the axial line of bolt 18, to conform with the desired depth of cut to be made into the work.

There is also shown in Figure 1, the shank 31 of a riveting die or set, as it will extend in practise from a collet chuck and the like in the lathe head stock. It will be noted from the foregoing that the tool 28, which is of the side cutter type, may be readily alined with its cutting point in the axial plane of the rivet set, so as to cut an axially disposed concavity in the end thereof during manually actuated and controlled swinging movement of the pedestal 16 by its handle.

By thus providing for the cutting of the end concavity of the rivet set, it is obvious that the tool holder may be run toward the work, after having been properly positioned as above, with the pedestal turned at an angle to the work so that the tool point touches the perimeter of the end of the work. Then by swinging the pedestal to manually feed the tool point to the axial line of the work, the concavity is completed to a depth depending upon the previous axial adjustment of the cutting point of the tool beyond the line of the axis of the pivot bolt 18. Waste of material is thus eliminated, and the operation is so simple that a workman unskilled in general metal working may be easily and quickly inducted into the work.

After the concavity has thus been formed, the holder may be backed away from the work and the tool moved across the end of the rivet set, to face said end, and also shifted so that the side cutting edge of the tool will circumferentially reduce the outside surface of the work adjacent to its end to a diameter leaving an end edge of desired width around the perimeter of the concavity.

The invention is especially important in providing for the cutting of concavities by the use of a tool which may be repeatedly ground and sharpened without the minute contouring necessary with the tools at present used with an arcuate end cutting edge. The same tool, according to the present invention, may be used for work of different sizes and this is an added advantage as compared with the use of contoured tools. Moreover, according to the present invention, a tool is used in a manner which leaves a clean uniformly even surface within the formed concavity, thus greatly reducing the time and labor of the subsequent polishing operation.

Having thus fully disclosed the invention, what is claimed therein is;

1. A lathe tool holder for radius cutting, comprising in combination with the tool rest of a lathe having a transverse groove an anchor plate presenting an upper, horizontally flat surface, an anchor bar in the groove of the lathe rest, means carried by said plate for anchoring the same to said anchor bar, a horizontally swingable tool support, in a single piece, on said plate, having a base portion seated flatwise on said plate surface, a pivot member extending vertically through said base portion and fixed in said anchoring plate, whereby to confine the tool support to horizontally swinging movements with respect to the plate, said tool support also including a tool carrying upright rising from, and integral with, the rear of the base portion, and having an upper, forward portion partially overlying the said pivot member and terminating in definitely spaced relation rearwardly of the vertical axis of said pivot member, whereby the forward extension of a tool, beyond the vertical axis of the pivot member, may be readily gauged from the forward face of said upright, and a handle carried by, and rigid with, said tool support, whereby it may be manually swingably shifted to move the tool during the cutting operation.

2. A lathe tool holder for radius cutting, comprising an anchor plate presenting an upper, horizontally flat surface, means carried by said plate and the tool rest of a lathe for anchoring the same to said lathe, a unitary horizontally swingable tool support, on said plate, having a base seated flatwise on said plate surface, a pivot member extending vertically through said base portion and fixed in said anchoring plate to thus confine the tool support to horizontally swinging movements with respect to the plate, said tool support base provided with an offset portion upstanding from, and integral with, the rear of the base, having an undercut lower forward portion adjacent the pivot member providing a space for a means to operate said pivot member and having an upper forward portion partially overlying the said pivot member and terminating in definitely spaced relation rearwardly of the vertical axis of the pivot member, a tool carried by said upright and extending forwardly beyond the vertical axis of the pivot member, and whose said extension may be readily gauged from the said upper forward portion of the upright, and a handle carried by, and fixed to, said tool support whereby it may be manually shifted to move the tool during the cutting operation.

3. A tool holder for radius cutting comprising, in combination with the tool rest of a lathe having a transverse groove, a plate, an anchor bar in the groove of said lathe rest, means conjoining the plate and bar for anchoring said anchor bar to said lathe rest, a tool support having a base, a pivot member extending through said base and fixed in said plate, said tool support swingable horizontally about said pivot, means interposed between said pivot and base to hold said tool support frictionally against accidental movement, said tool support upstanding from and being offset with respect to said base to provide free access to said pivot, and a tool carried by said support.

WILLIAM W. LINYARD.